No. 791,524. Patented June 6, 1905.

UNITED STATES PATENT OFFICE.

HUGO WITTER, OF ELBERFELD, GERMANY, ASSIGNOR TO FARBENFABRIKEN OF ELBERFELD CO., OF NEW YORK, N. Y., A CORPORATION OF NEW YORK.

YELLOW DYE.

SPECIFICATION forming part of Letters Patent No. 791,524, dated June 6, 1905.

Application filed March 13, 1905. Serial No. 249,813.

*To all whom it may concern:*

Be it known that I, HUGO WITTER, doctor of philosophy, chemist, (assignor to the FARBENFABRIKEN OF ELBERFELD COMPANY, of New York,) residing at Elberfeld, Germany, have invented a new and useful Improvement in Yellow Dyes; and I hereby declare the following to be a clear and exact description of my invention.

My invention relates to the production of new tetrazo dyestuffs which dye wool yellow shades fast to milling and do not stain the interwoven white cotton or wool.

The new dyestuffs can be obtained by combining with two molecular proportions of phenylmethylpyrazolon one molecular proportion of the tetrazotized derivatives of benzidin- or tolidin-meta-disulfonic acid having the following general formula:

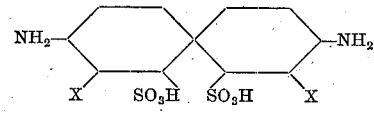

in which formula X means hydrogen atoms which can be replaced by the methylic group.

The new coloring-matters are in the shape of their alkaline salts yellowish-red powders soluble in water and in concentrated sulfuric acid with a yellow color and yielding upon reduction with stannous chlorid and hydrochloric acid the diamidodiaryldisulfonic acids of the above-given general formula and amidomethylphenylpyrazolon. They dye wool from acid-baths yellow shades fast to milling.

In carrying out my invention practically I can proceed as follows, (the parts being by weight:) Three-hundred and forty-four parts of benzidin-meta-disulfonic acid are diazotized in the usual manner with the aid of hydrochloric acid and one hundred and thirty-eight parts of sodium nitrite. The tetrazo solution thus obtained is mixed on cooling with a solution of three hundred and eighty parts of phenylmethylpyrazolon in dilute hydrochloric acid, and an excess of sodium acetate is then added thereto. After the formation of the dyestuff is completed the reaction mass is rendered alkaline by the addition of sodium carbonate, and the new coloring-matter is isolated in the usual manner. The new dyestuff thus obtained is after being dried and pulverized a yellowish-red powder soluble in water and in concentrated sulfuric acid with a greenish-yellow color. Upon treatment with stannous chlorid and hydrochloric acid benzidin-meta-disulfonic acid and amidomethylphenylpyrazolon is obtained. It dyes wool from acid-baths yellow shades.

The process proceeds in an analogous manner on replacing the benzidin-meta-disulfonic acid by the tolidin-meta-disulfonic acid.

Having described my invention and in what manner the same is to be performed, what I claim as new, and desire to secure by Letters Patent, is—

1. The herein-described new tetrazo dyestuffs obtainable by the combination of the tetrazo compounds of the para-diamin-disulfonic acids having the above-given general formula with two molecular proportions of phenylmethylpyrazolon, which dyestuffs are in the shape of their alkaline salts yellowish-red powders soluble in water and in concentrated sulfuric acid with a yellow color; yielding on reduction with stannous chlorid and hydrochloric acid the diamidodiaryldisulfonic acids of the above-given formula and amidomethylphenylpyrazolon; and dyeing wool from acid-baths yellow shades fast to milling, substantially as hereinbefore described.

2. The herein-described new tetrazo dyestuff obtainable by the combination of the tetrazo compound of benzidin-meta-disulfonic acid with two molecular proportions of phenylmethylpyrazolon, which dyestuff is in the shape of its sodium salt a yellowish-red powder soluble in water and in concentrated sulfuric acid with a greenish-yellow color; yielding on suitable treatment with stannous chlorid and hydrochloric acid benzidin-meta-disulfonic acid and amidomethylphenylpyrazolon; and dyeing wool from acid-baths yellow shades, substantially as hereinbefore described.

In testimony whereof I have signed my name in the presence of two subscribing witnesses.

HUGO WITTER.

Witnesses:
OTTO KÖNIG,
J. A. RITTERSHAUS.